3,544,160
SEAT BACK POSITIONING SYSTEM
Norman M. Karasick, Salisbury, Conn., assignor to Universal Oil Products Company, Des Plaines, Ill., a corporation of Delaware
Filed Dec. 27, 1968, Ser. No. 787,359
Int. Cl. A47c 1/024
U.S. Cl. 297—355   6 Claims

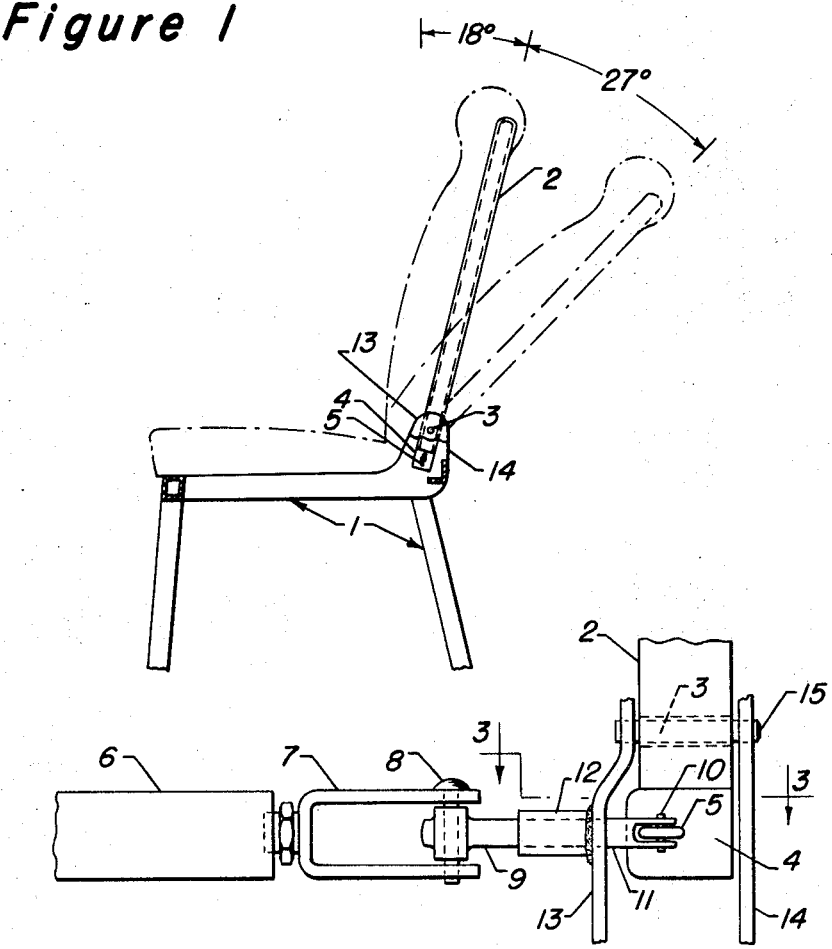
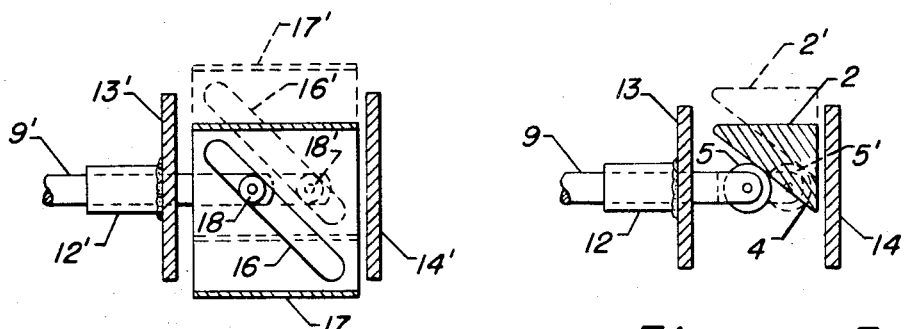
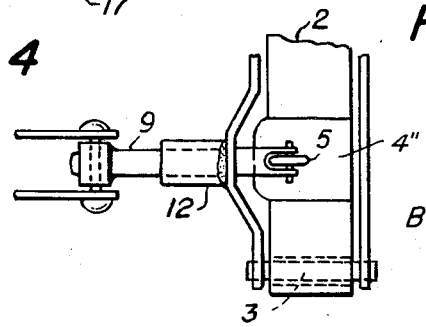

ABSTRACT OF THE DISCLOSURE

Seat back adjustment is effected through the use of a laterally positioned adjuster-locking unit which has a movable rod member to move in a plane parallel with the plane of the seat back and such rod is provided with cam follower means to move against a cam surface which, in turn, is on a portion of the seat back that is closely adjacent the pivot zone for the latter, whereby small cam movements will permit relatively greater seat back movements.

---

This invention relates to a seat back adjustment and locking system. More particularly the invention may be considered to be directed to a simplified back adjustment and locking system where movable cam means will effect the seat back adjustment and the actuator unit for the cam means is positioned to be along the lower portion of the seat back in a plane parallel thereto.

Generally, seat back adjustment units, whether hydraulic or mechanical, are positioned to be in a plane that is perpendicular or normal to the plane of the seat back. In other words, actuators are usually placed under the seating zone or in an up-and-down position along a seat back such that reciprocating movement of a piston rod or other moving actuating member will effect the direct tilting of the seat back about its pivoted connection to the seat frame. However, in certain instances, there are designs and arrangements where there is lack of space or it is just undesirable to have the adjusting unit under the seat proper or within the seat back itself. In such cases, it is of advantage to have a seat locking and adjustment system which will involve a minimum of space and mechanism and, at the same time, is adapted for being placed in a position transverse to the tilt or swing movement of the seat back.

Thus, it may be considered to be a principal object of the present invention, to provide a seat back actuator-lock system which is adapted to be installed laterally along the lower edge portion of a pivoted and adjustable seat back.

It may be considered a further object of the invention to provide a back adjustment and lock system which utilizes cam means to effect the adjustable movement of the seat back, with the cam means being positioned closely adjacent the pivot points for the seat back such that a small came movement from the actuator will permit a relatively wide range of seat back adjustment.

In a broad aspect, the present invention provides a seat back adjustment means for use in combination with a seat having a pivotally connected seat back, with such back adjustment system comprising in combination, one cam surface on a portion of the seat back which is at an elevation closely adjacent the pivot point connection of the seat back to the seat framing, an atcuator-lock unit having at least one reciprocal rod member adjustably movable therefrom, with said lock unit positioned with respect to said seat back to have said rod member move in a plane substantially parallel with the plane of the back, and a cam surface means on said rod member to engage said cam surface on said seat back, whereby there is a resulting adjustable holding of said back in a desired position.

There are various types of actuator units or locking devices which have been utilized, or may be used, in combination with seats to effect the positioning adjustment of a tilting type of seat back. For instance, there have been various forms of hydraulically operated pistons with at least one piston rod member which will reciprocate in a manner to effect linear movement and adjustment of the seat back or other object. In this hydraulic type of adjustment unit there is a movable piston and means for having liquid flow from one side of the piston to the other within an enclosed cylinder such that there is an adjustable movement of the piston and a locking thereof in any desired piston.

There are also various types of power driven position-adjusting mechanisms utilizing electric switching means to effect the powered movement of a threaded rod or screw member with respect to a fixed or moving nut arrangement whereby there is a desired linear movement provided by the adjusting device. In other instances there may be spring operated screws or linearly adjustable members which provide for the position-adjusting of the seat back so that there is no need for electric power or the use of fluids in hydraulically operated piston arrangements.

Although the present invention is not limited to any one type of actuator or position adjusting mechanism, it is a particular provision of the system to have the actuator positioned along the lower edge portion of the seat back such that it does not encumber space below the seat proper or have to be built within the seat back itself. Further, it is a provision of the present system to have a movable cam arrangement between the movable rod portion of the actuator and a lower portion of the seat back. For example, one or both sides of the seat back may be provided with as loping or curved cam surface or guide zone and positioned to engage with an accompanying cam follower or cam surface means provided as a part of the movable adjustment means such that there may be adjustable positioning of the entire seat back about its pivot point. Generally, the adjustment cam means will be closely spaced below the pivot point such that a small arcuate movement with respect to the pivot point will permit a relatively large tilting movement for the seat back proper. The cam surface may, however, be positioned above the pivot point a short distance, rather than below, in order to accomplish the same type of tilting adjustment.

There may be a single cam surface and a companion am means from a single reciprocating rod member as a part of the position-adjusting mechanism or, alternatively, there may be two cam surfaces provided on the seat back means and corresponding follower means or cam surfaces from a double ended position-adjusting means. For example, in certain of the hydraulic types of position-adjusters, there may be two opposing piston rod members such that there is movement from the actuator means in an opposing direction manner and the provision of two different cam surfaces on the seat back to provide for the tilting adjustment of the latter.

The cam adjustment means between the portion of the seat back and the actuator may embody simple curved or sloping cammed surfaces, or, alternatively, may embody a curved or sloping cam surface on one movable part and a roller type of cam follower means to engage therewith on the other moving part. In still other instances, the cam means may embody a slotted cam track arrangement or a sleeve or barrel cam type of design, where one sloping surface is entirely enclosed within an encompassing follower surface.

Reference to the accompany drawing and the following description thereof will serve to diagrammatically set forth one means of having an actuator positioned in a plane parallel with the seat back along the lower portion thereof and make use of cam means in effecting tilting adjustment for the seat back and, at the same time, additional advantageous features for the lateral system will be set forth in connection therewith.

DESCRIPTION OF THE DRAWING

FIG. 1 of the drawing is a diagrammatic elevational view indicating a tilting back arrangement for a seat which may be used in a passenger vehicle with a cam surface provided closely below a pivot point for the seat back.

FIG. 2 shows, in a partial elevational view, the engagement of a cam follower means with a cam surface which is a part of the seat back framing at an elevation closely below the pivot point for the tiltable seat back.

FIG. 3 is a partial sectional view through the cam surface, as indicated by the line 3—3 in FIG. 2.

FIG. 4 is a sectional plan view indicating a modified slot or track type of cam arrangement which may be utilized in lieu of the embodiment of FIGS. 2 and 3.

FIG. 5 is a partial elevational view showing a cam follower means with a cam surface which is a part of the seat back framing at an elevation above the pivot point connection.

Referring now to FIGURES 1 and 2 of the drawing, there is indicated a seat frame 1 which is adapted to have a tilting seat back 2 by means of pivot connection means at 3. There is diagrammatically indicated a cam surface 4 on the lower frame or post section 2 which is a short distance below the pivot point 3 and adapted to be contacted by a suitable cam follower means such as 5 (as best shown in FIG. 2). The seat back 2 is tiltable about pivot point 3 through a given arcuate range, as indicated diagrammatically in FIG. 1, which may vary from approximately 18° to 45° from the vertical, depending upon the particular type of seat or upon the type of vehicular equipment into which the seat is being installed.

As best shown in FIG. 2, there will be an actuator unit 6 which, in this embodiment, has yoke means 7 and pin means 8 to connect with a linearly movable rod 9 to a roller or other follower means 5. In this instance the roller 5 is shown connected by pin means 10 to a clevis portion 11 in the end of rod 9. The latter, in turn, is held in a position of lateral alignment by sleeve bearings 12 which connect to a plate portion 13 which is a part of the overall seat framing 1. As indicated diagrammatically by both FIGS. 1 and 2, there are framing portions 13 and 14 which extend upwardly from the seat framing 1 to hold a pin member 15 that, in turn, will act as a pivot point 3 for seat back framing 2. The latter is also provided with the cam surface or cam portion 4 which is adapted to engage the cam roller or follower means 5 from actuator means 6 and, as indicated in the elevational view of FIG. 2, the entire cam means is positioned a short distance below the pin 15 and pivot point 3 for the tilting of seat back tubing.

In FIG. 3, there is indicated in a sectional plan view, the positioning of cam roller means 5 against the cam surface 4 so as to better illustrate how the lateral or reciprocating movement of rod means 9 from the actuator 6 will provide for varying adjustments of the back framing 2. In other words, as the rod 9 is moved linearly outward, or to the right as shown in FIG. 3, there will be the adjustment of the seat back framing 2 into the position indicated by the dashed lines 2', whereby the entire seat back will tilt backwardly about pivot point 3 or, conversely, where roller 5 from rod 9 moves still further inwardly, there will be adjusted movement of the seat framing 2 in the opposing direction to give a resulting more upright position.

It will be noted that the present cam surface 4 is shown to be a straight surface extending diagonally with respect to the movement of the rod member 9 and follower means 5; however, this surface may be slightly convex or concave where it is desired to modify the movement or tilting for the seat back for a given lateral movement of the actuator rod 9. It will also be obvious that at least one cam surface arrangement is needed between an actuator unit and the seat back framing in order that the latter may be selectively positioned in various fixed or locked positions. However, where it is deemed desirable to have a nonflexible and relatively rigid supporting action, without any torque effects, there may be a similar cam surface and follower means on the opposing side of the seat frame and on an opposing side of the seat back framing such that there is a cam support and contact on at least two portions, or two sides, of the seat back.

The laterally positioned adjuster or actuator 6 may be mounted or otherwise fixedly held along the center position of the seat framing so as to have its movable rod means move linearly back and forth in a lateral plane, parallel with respect to the seat back and contact the one or more cammed surfaces at a desired point below, or above, the pivot point means 3. On the other hand, where a hydraulic type of adjuster is used and in particular, a double-ended hydraulic form of locking device is provided, there may be a "floating" of the entire lock or actuator means between or within the linear bearings at each side of the seat framing. In this arrangement, each movable end rod portion with its cam means will simultaneously permit movement of each cam means on the seat back framing and provide movement of the seat back into a different tilted position.

It is not believed necesary to provide a detailed explanation of the construction and operation of a hydraulic locking device inasmuch as such types of devices are commonly used in connection with adjustable seat back operations, and devices of this type have been shown in U.S. Pats. 2,559,047 and 3,051,274. With respect to the mechanical form of position adjuster, reference may be made to U.S. Pat. 3,046,055 which patent more fully illustrates a spring operated or adjustment for a screw member in turn particularly adapted for use in effecting seat back adjustments.

In FIG. 4 of the drawing, there is shown the use of a cam track or diagonal slot 16 in a cam plate 17 which is a part of the lower end of seat back framing 2. Riding within the slot 16 is a pin or roller 18 which serves as a cam follower or cam mover that is attached to the end of the actuator rod 9'. Bearing means 12' and support plates 13' and 14' are shown to be similar to the equivalent parts in FIG. 3 and will serve in the same functions. The dashed lines 16', 17' and 18' also shown how the cam plate 17' (and thus its superposed framing) will be moved by added lateral movement of rod 9' to in turn provide seat back position adjustments. Still other cam constructions may, of course, be provided with a laterally positioned actuator and may be considered to be within the scope of the present invention.

With respect to FIG. 5 of the drawing, there is shown a modification of the arrangement of FIG. 1, 2 and 3, to the extent that the sloping cam surface and the cam follower means are positioned a short distance above the pivot point for the seat back framing 2, rather than at an elevation below the pivot point. In other words, in an optional construction, the cam surface, such as 4", can be provided at a closely adjacent elevation above the pivot point 3 and the level of the actuator means with movable rod 9 to roller 5 will also be elevated with respect to the location of the pivot point 3.

I claim as my invention:

1. In combination with a seat back which is pivotally connected to a seat frame, a back adjustment system which comprises in combination, a cam surface on a portion of the seat back which is at an elevation closely adjacent the pivot point connection of the seat back to the seat framing, an actuator-lock unit having at least one reciprocal rod member adjustably movable therefrom, with said lock unit positioned with respect to said seat back to have said rod member move in a plane substantially parallel with the plane of the seat back, and a cam follower means on said rod member to engage said cam surface on said seat back, whereby there is a resulting adjustable holding of said back in a desired position.

2. The seat back adjustment system of claim 1 further characterized in that the cam surface is provided on said seat back at an elevation below the pivot point connection to the seat framing and closely adjacent thereto.

3. The seat back adjustment system of claim 1 further characterized in that the cam surface is provided on said seat back at an elevation above the pivot point connection to the seat framing and closely adjacent thereto.

4. The seat back adjustment system of claim 1 further characterized in that a sleeve bearing means on said seat frame is provided to encompass said rod member from said actuator-lock unit and thereby maintain the latter in a desired lateral plane which is transverse with respect to said seat framing and parallel to the plane of the seat back.

5. The seat back adjustment system of claim 1 further characterized in that the cam follower means on said rod includes a roller means adapted to minimize friction with said cam surface.

6. The seat back adjustment system of claim 1 further characterized in that said cam surface is a slot-form track adapted to encompass the cam follower means connecting to said rod member of the actuator-lock unit.

References Cited

UNITED STATES PATENTS

| 362,796 | 5/1887 | Tait | 297—354 |
| 1,251,709 | 1/1918 | Turner | 297—355 |

FOREIGN PATENTS

| 287,277 | 3/1928 | Great Britain | 297—355 |

REINALDO P. MACHADO, Primary Examiner